United States Patent [19]

Atteck et al.

[11] Patent Number: 4,488,332
[45] Date of Patent: Dec. 18, 1984

[54] REMOVAL OF MEAT FROM POULTRY LIMBS

[75] Inventors: Louis Atteck, Harrow; David N. Wilson, Hellesdon, both of England

[73] Assignee: Bernard Matthews Limited, Norfolk, England

[21] Appl. No.: 412,276

[22] Filed: Aug. 27, 1982

[30] Foreign Application Priority Data

Sep. 22, 1981 [EP] European Pat. Off. ...... 81 304 352.8

[51] Int. Cl.³ .................. A22C 17/04; A22C 21/00
[52] U.S. Cl. .......................... 17/46; 17/1 G; 17/11
[58] Field of Search ............ 17/11, 46, 1 G, 56

[56] References Cited

U.S. PATENT DOCUMENTS

| 3,296,653 | 1/1967 | Segur | 17/11 |
| 3,412,425 | 11/1968 | Sturm | 17/11 X |
| 3,457,586 | 7/1969 | Zwier et al. | 17/46 X |
| 3,510,908 | 5/1970 | Segur et al. | 17/11 |
| 3,629,903 | 12/1971 | Turner | 17/71 |
| 3,665,553 | 5/1972 | Colosky | 17/11 |
| 4,377,884 | 3/1983 | Viscolosi | 17/46 X |
| 4,380,849 | 4/1983 | Adkison et al. | 17/11 |

FOREIGN PATENT DOCUMENTS 2227369 1/1973 Fed. Rep. of Germany

Primary Examiner—Willie G. Abercrombie
Attorney, Agent, or Firm—Parkhurst & Oliff

[57] ABSTRACT

A small poultry limb, such as a turkey drumstick, is clamped to a longitudinally movable ram. The limb is thrust by the ram through a first resiliently flexible stripping device and a second stripping device. The bone passes through the stripping devices but the skin and tendons clamped to the ram are held and turned back over the ram thus exposing the meat for stripping.

15 Claims, 6 Drawing Figures

REMOVAL OF MEAT FROM POULTRY LIMBS

DESCRIPTION

This invention relates to the removal of meat from poultry limbs. For convenience this operation will be referred to as "deboning". The invention is particularly concerned with the deboning of that part of a turkey leg known as a "drumstick", which is typically of the order of 22 centimeters long depending naturally on the size of the bird. A turkey drumstick, and hence a poultry limb of the kind with which the invention is applicable, is characterised by an internal bone with enlarged end parts, a surrounding layer of meat and an outer skin. As is implied from the name "drumstick", one end part of the limb, the meatier end, is significantly larger than the other. Bony tendons extend from the larger end part and over the smaller to the birds's foot.

Turkey drumsticks and similar small poultry limbs are conventionally deboned manually using a knife to make an initial longitudinal slit through the skin and meat followed by a laterally outward tearing motion with the hands. This procedure is labour intensive and uneconomic.

The objective of the present invention is to provide a method and a machine for deboning poultry limbs of the kind set forth above and which method and machine removes the meat but leaves the bone, tendons and skin as residual material.

In accordance with a first aspect of the present invention there is provided a method of deboning a poultry limb with relatively small and large end parts. This method comprises the steps of clamping the smaller end part of the limb securely to hold the tendons of the limb and longitudinally advancing the larger end of the limb through at least a first stripping device which at least partially strips the bone off the limb from the larger to the smaller end. The advance of the limb continues beyond the stripping device with the tendons held so that the meat overlays the skin and thus falls away or is available for ready removal.

Preferably, a second stripping deive is also provided to remove the overlaying meat left by the first stripping device. The first stripping device should be resiliently flexible in character and may define an aperture which is undersized relative to the larger end part of the limb to be stripped. The stripping element will be forced aside by the bone passing through the aperture but will exert sufficient resilient force to hold back the flesh and the skin. In use, consequently, the skin will be turned "inside-out" as envisaged above. The second stripping device which is rigid in character can then remove any remaining exposed meat and leave the tendon and the skin held by the clamping means.

In accordance with another aspect of the invention, there is provided apparatus comprising clamping means for securing the smaller end part of the limb, first stripping means which, on longitudinal advance of the limb through it, do not substantially obstruct the bone but prevent passage of the skin and a substantial part of the meat, and means for causing the relative longitudinal movement between the clamping means and the first stripping means.

The invention will now be described by way of example and with reference to the accompanying drawings wherein.

The constructional features of the apparatus will first be described.

Figure 1:
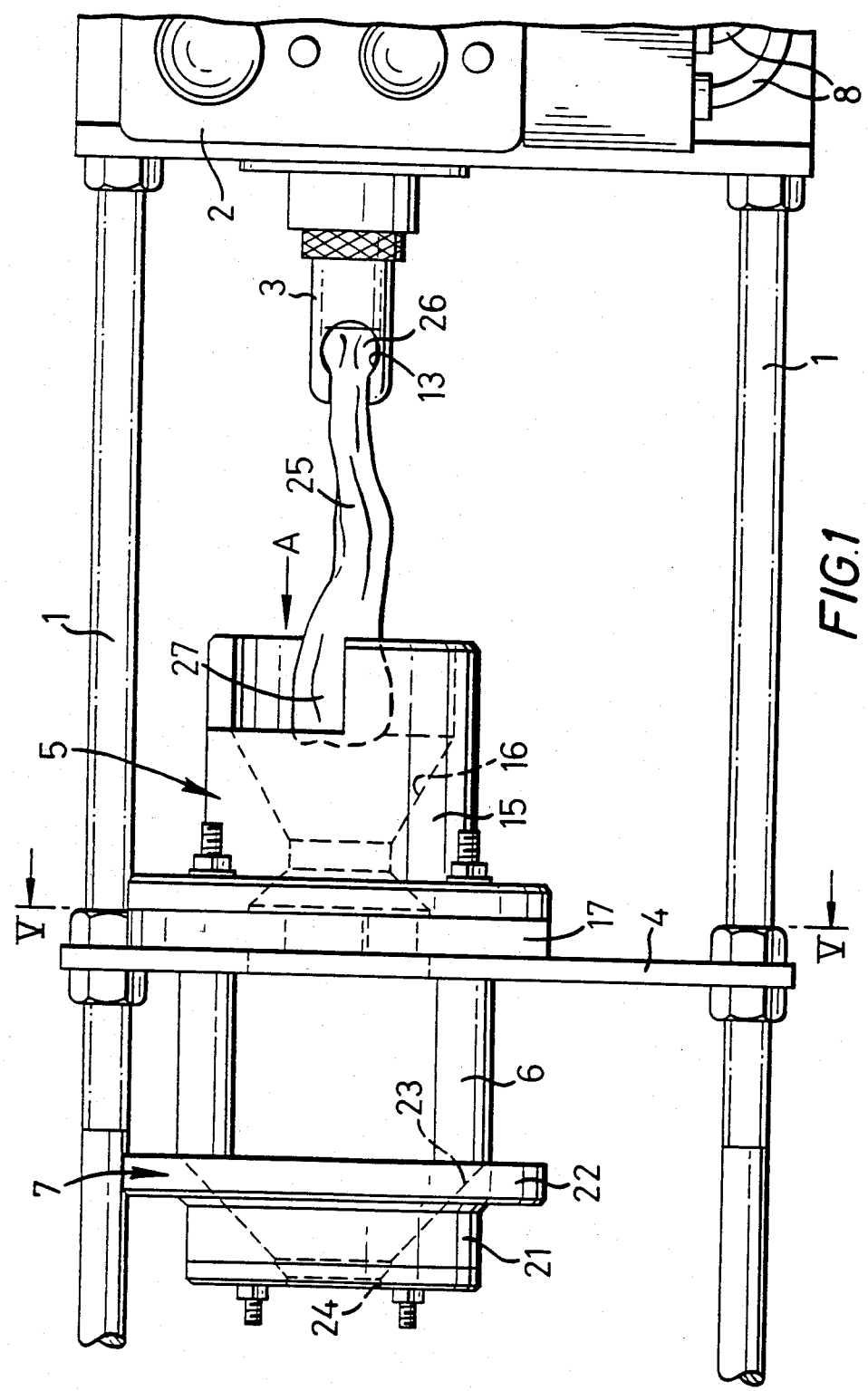
FIG. 1 is a side view of an apparatus in accordance with the invention with a poultry limb held in the initial position of a stripping or deboning cycle.

Referring initially to FIG. 1 of the drawings, the apparatus comprises a frame structure of longitudinally extending rods 1 extending forwardly from a housing 2 for a hydraulically operated longitudinally reciprocable ram 3. Longitudinally spaced from the housing 2 is a transverse plate 4 (see also FIGS. 4 and 5) supporting a first stripping device 5. From the front surface of the plate 4 posts 6 extend to support a second stripping device 7.

Figure 6:
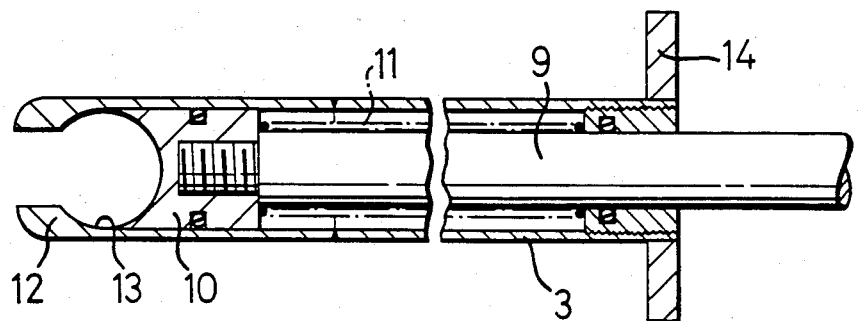
FIG. 6 is a detail of the ram and clamp construction for holding the limb.

The ram 3 is hydraulically reciprocated through liquid lines 8 by conventional structure not shown and is driven through an internal rod 9 (see FIG. 6) with a part spherical clamping part 10 at the front end. The rod 9 is slidably received within the main body of the ram and is biassed by a spring 11 to the front position illustrated in FIG. 6. The front end of the ram body closes to part spherical jaws 12 so as to define a part spherical recess with a side entry to receve the small end of a poultry limb. When the ram is moving, the said small end is held by the force exerted by spring 11 through clamping part 10. At the retracted position shown in FIG. 1 flange 14 butts up against a stop (not shown) and the rod 9 then performs a limited further backward stroke to withdraw clamping part 10 to allow entry and removal of a limb.

Figure 4:
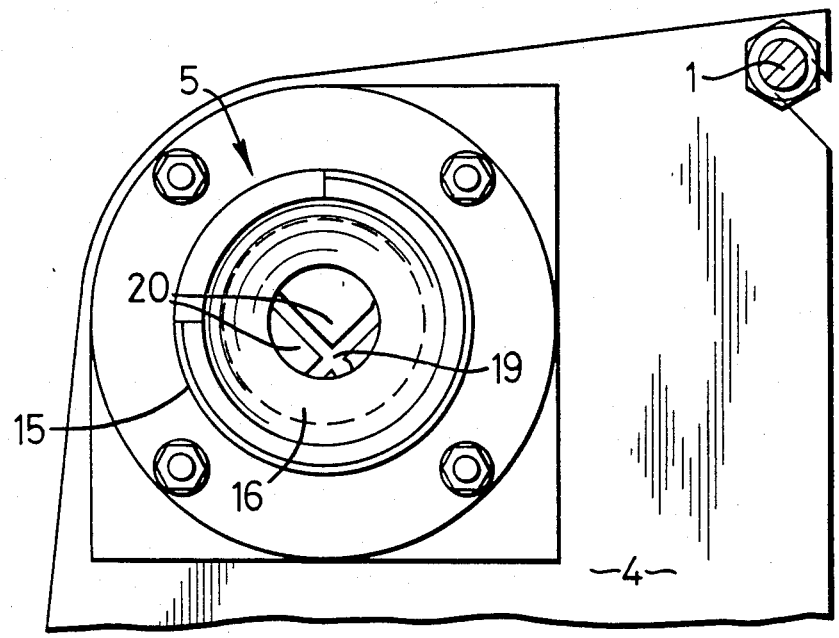
FIG. 4 is a view of the apparatus without the held limb looking along the arrow A of FIGS. 1 and 2.
Figure 5:
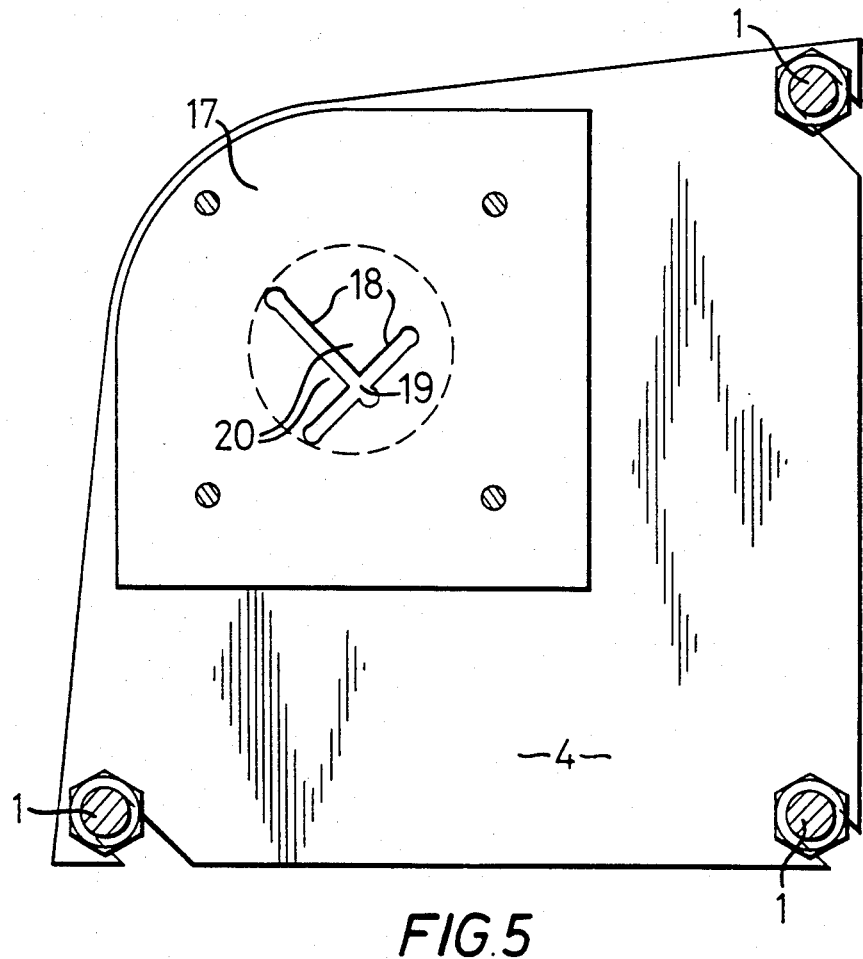
FIG. 5 is a section on the line IV—IV of FIG. 1.

The first stripping device 5 comprises a cylindrical body 15 with a frusto-conical entry passage 16, the body being of rigid material. The body 15 is bolted to the plate 4 with the intermediary of a thick rubber member 17 (FIG. 5) having two slits 18 in the form of a cross with an aperture 19 at the intersection and flexible generally triangular meat and bone stripping resiliently flexible flaps 20. The view of the aperture 19 and the stripping flaps 20 'seen' by the limb is illustrated in FIG. 4. It will be appreciated that the aperture 19 is considerably smaller than the width of the larger end of the limb being stripped.

The second stripping device is constituted by a short cylindrical part 21 and a flange 22 attached to one of the rods 1, together defining a frusto-conical entry passage 23 to a round rigidly defined stripping hole 24 of diameter slightly greater than that of the ram 3 to be pushed therethrough. The ram in turn has a diameter which is approximately equivalent to that of the largest bone end to be dealt with.

Figure 2:
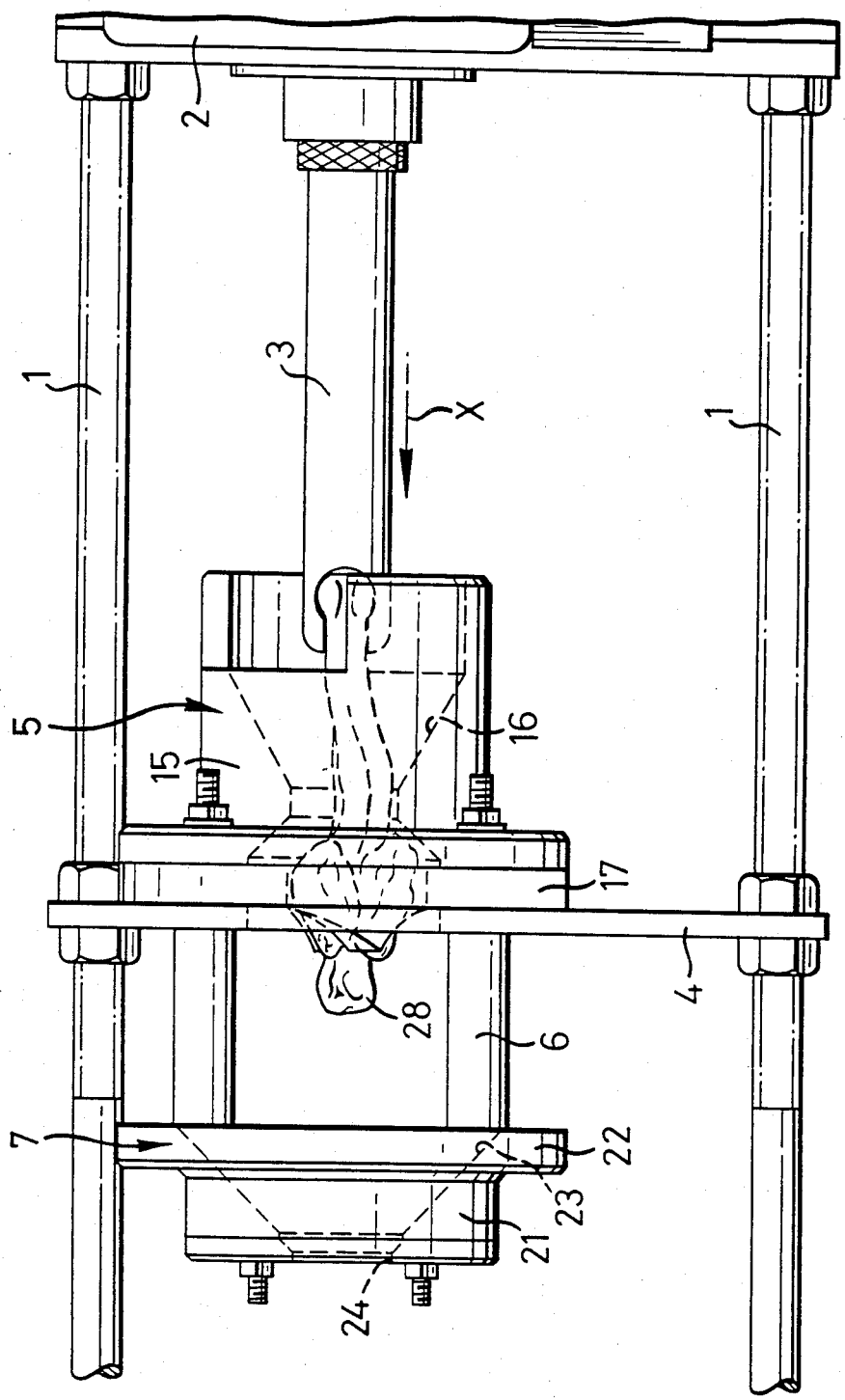
FIG. 2 is a view similar to FIG. 1 showing a later part of the cycle with the limb advanced into and partially through a first stripping device.
Figure 3:
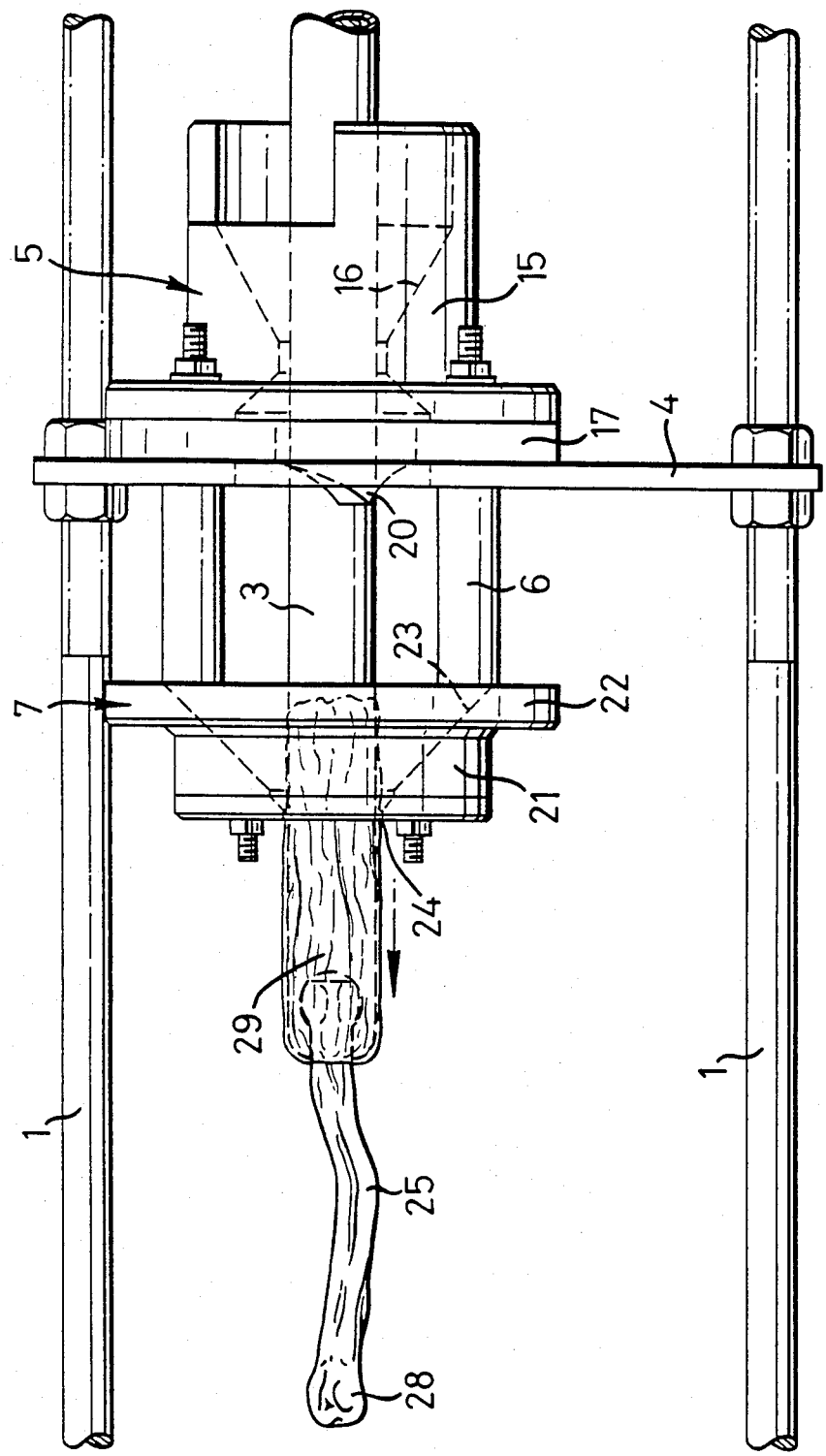
FIG. 3 is a view similar to FIGS. 1 and 2 showing the stripped limb towards the end of the stripping stroke.

Turning now to the operation of the device. The limb 25 to be deboned is, for example, a turkey drumstick with a small end part 26 and a large end part 27. The small end part 26 is inserted into opened recess of ram 13 and the stripping and deboning cycle is initiated by moving the ram forward in the direction of arrow X thus closing the recess 13 and firmly clamping the limb small end part 26. Prior to insertion, a thin slice is preferably taken off the limb large front end. The large end part 27 of the limb 26 advances through passage 16 of the first stripping device and is forced through aperture 20 of rubber member 17. The flaps 20 are forced apart to allow entrance and passage of the exposed bone 28 (see FIG. 2) but have sufficient resiliently applied force to resist passage by the meat and skin. A stripping action thus commences and the skin 29 including tendons rolls back over the ram, the tendons being held at the small end by the ram clamp. While the bone 28 is advanced and the rear end part of the limb held, the skin and flesh are rolled back and most of the meat is removed from the bone. The ram 3 with the rolled back skin and the remaining meat then passes through the second stripping device 7 and the remainder of meat it left in the space between the two stripping devices to the final condition indicated in FIG. 3 with the small end part of the limb still firmly held on the ram; the skin 29 rolled back over the ram 3 and the bone substantially clean. There is sufficient clearance between the rim of hole 24 of the second stripping device and the outer surface of the ram 3 to allow passage of the rolled back skin without tearing. The meat stripped falls away to the lower parts of the apparatus and the ram is returned or retracted to the start position, the first stripping device 5 serving to roll back the skin from the ram to the original position overlying the bone. The clamp is opened as previously described, the stripped limb is removed and a new limb is inserted and the cycle repeated. The return stroke helps to dislodge the meat as does the advance and return of successively stripped limbs.

While in the embodiment described above the stripping devices are held stationary and the ram holding the limb is advanced longitudinally, the invention contemplates devices where the required relative stripping movement is achieved by holding the limb still and moving the stripping devices either together or in successive passes.

The dimensions of the ram 3 and the apertures 19 and 24 of the stripping devices 5 and 7 are chosen having regard to the limbs being stripped.

We claim:

1. A method of removing meat from a bone of a poultry limb having a first end and a second end, comprising:
   clamping said first end of said poultry limb into a forward end of a ram with said second end of said poultry limb extending away from said ram in an axial direction with respect to said ram; and
   axially advancing said ram and poultry limb through a first aperture in a first stripping device so that said meat is turned back over an outer periphery of said ram and falls away from or is readily removed from said ram.

2. The method according to claim 1, wherein said poultry limb comprises a bone, meat, tendons and skin, said first end being smaller than said second end, and wherein said first end is clamped into said forward end of said ram in such a manner that said tendons and skin are firmly held with said first end.

3. The method according to claim 2, wherein said ram is further axially advanced through a second aperture in a second stripping device to remove meat remaining on said ram while said tendons and skin remain on said ram.

4. The method according to claim 3, wherein said ram is subsequently retracted through said first and second apertures to roll back said tendons and skin off of said outer periphery of said ram.

5. Apparatus for removing meat from a bone of a poultry limb having a first end and a second end, comprising:
   a ram comprising a clamping device in a forward end thereof for clamping said first end of said poultry limb;
   a first stripping device comprising a first aperture axially forward of said forward end of said ram;
   said first aperture being adapted to allow axial passage of said bone and said forward end of said ram therethrough while stripping said meat away from said bone and turning said meat over an outer periphery of said ram;
   at least said forward end of said ram being adapted to advance axially through said first aperture.

6. Apparatus according to claim 5, further comprising a second stripping device, said second stripping device defining a second aperture axially aligned with said ram, said second aperture being adapted to allow axial passage of said bone and said forward end of said ram therethrough while stripping remaining meat away from said outer periphery of said ram.

7. Apparatus according to claim 6, wherein said second aperture is adapted to allow skin and tendons clamped to said ram to pass therethrough with said ram.

8. Apparatus according to claim 6, wherein said first aperture is defined by resiliently flexible stripping elements, said aperture being smaller than a maximum diameter of a poultry limb bone to be passed therethrough.

9. Apparatus according to claim 8, wherein said stripping elements are defined by crossed slits in a piece of elastomeric material.

10. Apparatus according to claim 7, wherein said second stripping device defining said second aperture is rigid, and said second aperture has a diameter slightly larger than a diameter of said ram.

11. Apparatus according to claim 8, wherein said second stripping device defining said second aperture is rigid, and said second aperture has a diameter slightly larger than a diameter of said ram.

12. Apparatus according to claim 5, further comprising means for advancing and retracting said forward end of said ram through said first aperture.

13. Apparatus according to claim 6, further comprising means for advancing and retracting said forward end of said ram through said first and second apertures.

14. Apparatus according to claim 5, wherein said clamping device comprises part-spherical jaws.

15. Apparatus according to claim 6, wherein said clamping device comprises part-spherical jaws.

* * * * *